3,636,077
ACID ADDITION SALTS OF 5-BENZOYL-4-HY-
DROXY - 2 - METHOXYBENZENESULFONIC
ACID AND 4-AMINOBENZOIC ACID ESTER
AND DERIVATIVES THEREOF
Dale Adrian Stauffer, Elkhart, Ind., assignor to
Miles Laboratories, Inc., Elkhart, Ind.
No Drawing. Continuation-in-part of application Ser. No.
702,537, Feb. 2, 1968. This application Dec. 17, 1968,
Ser. No. 784,473
Int. Cl. C07c 101/62
U.S. Cl. 260—471 R  3 Claims

ABSTRACT OF THE DISCLOSURE

Acid addition salts of 5-benzoyl-4-hydroxy-2-methoxy-benzenesulfonic acid and 4-aminobenzoic acid and ester derivatives thereof that are useful as sunscreen agents. These compounds are prepared by reacting 2-hydroxy-4-methoxybenzophenone with a halosulfonic acid to form an intermediate arylsulfonic acid and reacting the intermediate sulfonic acid with a lower alkyl 4-aminobenzoate to form a salt. If desired, these compounds may be hydrolyzed to form 4-carboxyphenylammonium 5-benzoyl-4-hydroxy-2-methoxybenzenesulfonate.

---

This is a continuation-in-part of copending application Ser. No. 702,537, filed on Feb. 2, 1968, now abandoned.

This invention relates to a novel series of compounds having beneficial properties. More particularly, this invention relates to a novel series of acid addition salts of 5-benzoyl-4-hydroxy-2-methoxybenzenesulfonic acid and 4-aminobenzoic acid and ester derivatives thereof that are advantageously used as sunscreen agents. This invention also relates to a novel process for the preparation of these new compounds.

Compounds of this invention may be characterized by the general structural formula:

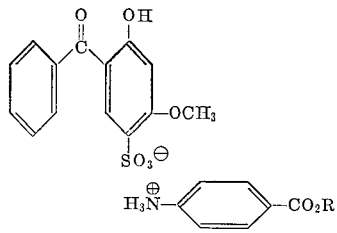

in which R is a member selected from a group consisting of H and lower alkyl. Advantageously, lower alkyls mentioned herein have between about 1 and 6 carbon atoms, although not limited thereto.

The novel salts of this invention may be prepared by reacting an intermediate arylsulfonic acid with a lower alkyl 4-aminobenzoate in the presence of a solvent that is inert under the reaction conditions. Preferably, solvents such as water, methanol, ethanol and other lower alkyl alcohols are utilized in this reaction. The reactants are beneficial heated under reflux for a period of time that is adequate to form a solution.

The product formed in this reaction is then worked up according to accepted chemical practices to form a substantially pure product of the desired compound.

The intermediate arylsulfonic acid may be prepared by reacting 2-hydroxy-4-methoxybenzophenone with a halosulfonic acid in the presence of a suitable solvent, such as chloroform, dichloroethane, or tetrachloroethane. The reactants are advantageously mixed at a low temperature, such as between about −10° C. and 15° C., with stirring. After mixing, the reactants may be allowed to warm to room temperature, i.e., about 23° C.

The new 4-carboxyphenylammonium 5-benzoyl-4-hydroxy - 2 - methoxybenzenesulfonate is prepared by hydrolyzing the ester derivative, a carbalkoxyphenylammonium 5-benzoyl-4-hydroxy - 2 - methoxybenzenesulfonate. This hydrolysis is readily effected by heating the ester with a base, such as sodium hydroxide or potassium hydroxide, and then acidifying the solution with excess of an acid, such as hydrochloric acid or sulfuric acid, to produce the desired benzoic acid. Other suitable methods for hydrolyzing an ester, known to those skilled in the art, may be used to obtain the desired benzoic acid.

The preparation of the carbalkoxyphenyl 5-benzoyl-4-hydroxy - 2 - methoxybenzenesulfonate (I) and the 4-carboxyphenylammonium 5 - benzoyl-4-hydroxy-2-methoxybenzenesulfonate (II) may be represented by the general chemical equation:

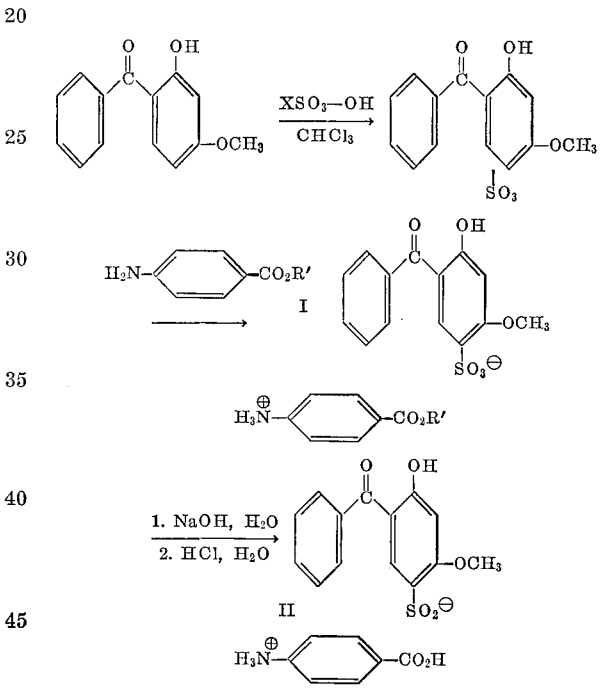

In the above equation X is a halogen such as chlorine, bromine, etc. and R' is lower alkyl.

The novel compounds of this invention have been observed to possess beneficial properties, particularly as sunscreen agents.

Sunscreen agents, as used herein, refer to compounds that are effective in preventing or substantially reducing the amount of radiation from a source of radiation, such as the sun or a mercury-arc lamp, that can strike a given surface. Such sunscreen agents may be used to prevent discoloration, embrittlement and other detrimental effects caused by such radiation. Sunscreen agents are widely used to prevent or reduce sunburn or erythema resulting from exposure to such radiation, particularly radiation in the critical burning range of 2800 to 3200 A. and especially 2970 A. to achieve this radiation protection, a layer of the novel compounds of this invention, in a sufficient concentration to achieve the desired radiation screening, in a suitable vehicle, is positioned intermediate to the surface to be protected and the source of radiation. The thickness of the layer selected will be determined according to the vehicle used and the screening desired.

Compounds of the invention were tested on a recording spectrophotometer for absorbance of light. These compounds were observed as having high extinction coefficients ($\epsilon_{max}$) such as 14,000 at a wavelength of 2870 A.

The properties of the compounds of this invention as sunscreen agents were also observed in a procedure for sunscreening assay in which the compounds as active ingredients in a suitable carrier were applied to an exposed area of skin on a rabbit which was subsequently exposed to ultraviolet light. In this procedure, a group of 10 albino rabbits of both sexes and weighing between about 1.7 and 3.0 kilograms were used. The abdominal hair of each rabbit was clipped and the abdominal skin shaved to remove all hair. Approximately one hour after shaving, the animal was tied down and a black rubber sheet 1/32 inch thick with four rectangular openings placed over the exposed abdominal skin. A layer of active ingredients in a hypo-allergenic ointment base that is substantially inactive as a sunscreen agent containing styryl alcohol, glyceryl monostearate, spermaceti, propylene glycol, mineral oil water, a preservative and an emulsifying agent (Dermabase) was applied to each of the four exposed areas of skin. The ointment with active ingredient was delivered in a volume of 0.05 ml. from a 1 ml. glass disposable syringe with its tip cut off. A wooden applicator was moved laterally back and forth over the skin to insure a uniform application of the ointment. A second black rubber sheet 1/16 inch thick with four circular openings was superimposed over the initial sheet containing the rectangular openings. Each circular opening was placed over a rectangular opening leaving uncovered the circular portion of the skin thereunder. An additional black sheet was placed over the adjacent abdominal skin to protect it from unnecessary exposure.

An ultraviolet source consisting of a Hanovia Analytical Model with a 325 watt quartz mercury-arc lamp was used. The energy was reflected downward through a No. 6527F filter. This filter allows transmission at various wavelengths as follows:

0%—2100 A., 65%—2500 A., 85%—3000 A., and 97%—3600 A.

An animal board with a rabbit thereon was positioned with the exposed abdominal skin 8 inches from the light source. The animal was exposed for 2 minutes and following the exposure the ointment was washed off with warm water and the skin blotted dry. The animal was returned to his cage for subsequent scoring of the erythema approximately 24 hours after exposure.

Each of the four exposed areas was scored as follows: 0, no erythema; 1, erythema barely perceptible; 2, partial erythema; 3, complete erythema; 4, erythema and edema or sloughing. The maximum erythema score for each animal was 16. Any animal which showed irritation because of hair removal, rubbing of abdomen on the bottom of the cage or other factor was not scored nor included in the results. The scorer in each instance was unaware of the treatment given to the animal being scored.

The compounds were prepared for testing by being ground to a fine powder in a mortar and incorporated into the Dermabase.

The rabbits were randomized into experimental and control groups each consisting of four animals. Data presented herein represents the pooling of results from two tests.

For evaluation purposes, a known sunscreen agent, 2-hydroxy-4-methoxy-benzophenone-5-sulfonic acid, was used. The plain ointment base, Dermabase, was applied to the control animals using the above procedure.

The results of suncreen evaluations for two separate tests are set forth in Tables I and II.

TABLE I

| Compound | Ex. No. | Number animals | Dose, percent by weight | Average erythema score±S.E. |
|---|---|---|---|---|
| 2-hydroxy-4-methoxy-benzophenone-5-sulfonic acid. | 2 | 8 | 1 | 13.6±2.0 |
|  | 1 | 8 | 10 | 0.4±0.3 |
| 4-carbethoxyphenylammonium 5-benzoyl-4-hydroxy-2-methoxybenzenesulfonate. | 1 | 8 | 1 | 8.1±2.6 |
|  | 1 | 8 | 10 | 0.6±0.3 |
| Control | 1 | 20 |  | 15.1±0.53 |
| 2-hydroxy-4-methoxy-benzophenone-5-sulfonic acid | 2 | 8 | 1 | 10.9±2.0 |
|  | 2 | 8 | 10 | 0 |
| 4-carbethoxyphenylammonium 5-benzoyl-4-hydroxy-2-methoxybenzenesulfonate | 2 | 8 | 1 | 6.3±2.1 |
|  | 2 | 8 | 10 | 0 |
| Control | 2 | 16 |  | 14.1±1.77 |

TABLE II

| Compound | Ex. No. | Number animals | Dose, percent by weight | Average erythema score±S.E. |
|---|---|---|---|---|
| 2-hydroxy-4-methoxy-benzophenone-5-sulfonic acid | 3 | 8 | 1 | 11.8±1.6 |
|  | 3 | 8 | 10 | 1.3±0.8 |
| 4-carboxyphenylammonium 5-benzoyl-4-hydroxy-2-methoxybenzenesulfonate | 3 | 8 | 1 | 5.5±1.7 |
|  | 3 | 8 | 10 | 1.0±0.6 |
| Control | 3 | 16 |  | 15.2±1.41 |

For a concentration of one percent, the compounds of the invention were observed to be about twice as effective as the standard.

When used as a sunscreen, compounds of the invention are preferably incorporated in a vehicle suitable for topical application, such as an emulsion, cream, lotion, ointment, suspension, solution, gel aerosol or the like, in which a fine powder may be effectively and uniformly dispersed or dissolved. Such a vehicle is beneficially cosmetically acceptable, greaseless or nonstaining, easy to apply in desired thickness, nontacky and pleasant in odor, color and appearance. A vehicle may be prepared by combining fillers, carriers, extenders, excipients, perfumes, color, antioxidants and similar ingredients in accordance with accepted pharmaceutical practices. Other active ingredients, such as antiseptics, skin softeners and the like, may be included in the vehicle to achieve a desired additional effect in conjunction with sunscreening. Solubility, particularly aqueous solubility, of the vehicle may be adjusted relative to expected conditions under which the sunscreen is to be used. A substantially water insoluble vehicle may be desired when prolonged or repeated contact with water is anticipated.

Suitable vehicles may be selected from formulations appearing in accepted pharmaceutical texts or readily available as commercial preparations. One such acceptable commercial preparation is Dermabase, a hypo-allergenic ointment base product. Following are formulae illustrative of vehicles that may be facilely compounded according to accepted pharmaceutical practices. These formulae are intended to be representative of formulations for vehicles, and it is to be recognized that other formulations that may be used will be known to those skilled in the art. All values are expressed in percent by weight.

Formula 1.—Sunscreen oil vehicle

Sesame oil _____ 42
Mineral oil _____ 58
Perfume, color and antioxidant Q.s.

Formula 2.—Sunscreen cream vehicle

Lanolin, deodorized _____ 37
Sesame oil _____ 21
Mineral oil _____ 21
Water _____ 21
Perfume, color and antixidant Q.s.

Formula 3.—Sunscreen lotion or cream

|  | Lotion | Cream |
|---|---|---|
| Veegum (colloidal magnesium-silicate) | 1.77 | 2.02 |
| Water | 77.71 | 71.12 |
| Glycerin | 2.28 | 3.55 |
| Sorbitan Monolaurate | 3.54 | 3.54 |
| Phenylmethylpolysiloxane | 5.07 | 5.07 |
| Polyoxyethylene sorbitan monolaurate | 4.56 | 4.56 |
| Stearic acid | 5.07 | 5.07 |
| Glyceryl monostearate | 0.00 | 5.07 |
| Perfume, preservative, color, etc | Q.s. | Q.s. |

A sunscreen composition of a predetermined percentage combination, tailored for a particular set of conditions, may be prepared by combining, as an active ingredient, a preselected amount of at least one novel compound of the invention with a suitable vehicle. This percentage of active ingredient may be varied over a broad range so as to permit satisfactory variations in sunscreen capability of specific compositions.

When a higher percentage of active ingredient, for example between about 3 and 10% or more, is used, substantially complete blocking of harmful radiation from the sun results. A concentration between about 1 and 3% is effective for substantially reducing sunburn and erythema while lesser amounts may be used with patients possessing a greater tolerance to light or when some tanning or absorption of sunlight is desired.

In preparing a sunscreen composition, the active ingredient is conveniently prepared as a fine powder prior to combining with the vehicle. The exact particle size of active ingredient is not considered critical. However, the powder should be fine enough that the resulting composition does not have a gritty feel after combining the active ingredient and vehicle. The active ingredient may also be dissolved in a suitable solvent prior to combining with a vehicle compatible with the solvent used. These compositions are beneficially prepared according to accepted pharmaceutical practices.

The invention will be further understood by reference to the following examples which describe specific compounds of the invention and the processes for the preparation thereof. These examples are representative of some of the novel compounds of the invention and are not intended to limit the scope of the invention as defined in the appended claims.

EXAMPLE 1

4-carbethoxyphenylammonium 5-benzoyl-4-hydroxy-2-methoxybenzenesulfonate monohydrate A solution of 2-hydroxy-4-methoxybenzophenone (228.3 g., 1 mole) in 250 ml. of chloroform was cooled in an ice-bath, and the mixture was stirred while chlorosulfonic acid (128.2 g., 1.1 moles) was added at a rate such that the temperature did not exceed 15° C. The addition required about 15 minutes. The clear yellow solution was allowed to stand in the ice-bath for 30 minutes longer. Then the mixture was allowed to come to room temperature. Hydrogen chloride was evolved, and the mixture became almost completely solid. After standing overnight the mixture was diluted with 250 ml. of benzene. The white solid material (5 - benzoyl-4-hydroxy-2-methoxybenzenesulfuric acid) was collected, washed with benzene and dried at 50° C.

The 5 - benzoyl-4-hydroxy-2-methoxybenzenesulfonic acid (294 g., 0.953 mole) was dissolved in 12 liters of water, and 157.4 g. (0.953 mole) of ethyl 4-aminobenzoate was added. The mixture was stirred and heated to the boiling point. The resulting clear pale yellow solution was stirred and cooled in an ice-bath. Pale yellow crystals were collected, washed with cold water and dried at 50° C. The 4 - carbethoxyphenylammonium 5-benzoyl-4-hydroxy-2-methoxybenzenesulfonate monohydrate (412 g., 84%) decomposed at ca. 225° C. with prior softening.

*Analysis.*—Calcd. for $C_{23}H_{23}NO_8S \cdot H_2O$: N.E, 491.5. Found: N.E., 491.0.

EXAMPLE 2

4-carbethoxyphenylammonium 5-benzoyl-4-hydroxy-2-methoxybenzenesulfonate

A solution of 2-hydroxy-4-methoxybenzophenone (45.7 g., 0.2 mole) in 150 ml. of chloroform was cooled to $-10°$ C. in an ice-salt bath, and the mixture was stirred while chlorosulfonic acid (46.6 g., 0.4 mole) was added at a rate such that the temperature did not exceed 0° C. The addition required about 15 minutes. The cooling bath was removed, and the clear light brown solution was allowed to warm up to room temperature. A yellow solid material separated out, and the mixture became almost completely solid. The mixture was stirred with 200 ml. of benzene, the crude acid chloride was collected, washed with benzene and dried in the oven at 50° C. for 30 minutes.

The crude intermediate (I) was not dried completely but was added portionwise to a solution of ethyl 4-aminobenzoate (33.0 g., 0.2 mole) in 150 ml. of pyridine. The mixture was heated under reflux for 4 hours, and the pyridine was removed by distillation under reduced pressure. The residue was mixed with about 500 ml. of cold water. The insoluble material was collected on a filter and washed with cold water. The filtrate and washings (A) were set aside. The precipitate was agitated thoroughly with 10 g. of $K_2CO_3$ and 300 ml. of water. The insoluble solid material was collected, washed with water and dried. The beige-colored crystals (6.0 g.) (M.P. 90–1° C.) represented the recovery of 18% of the unchanged ethyl 4-aminobenzoate. The filtrate and washings (B) were cooled in an ice-bath and acidified with hydrochloric acid. Filtrate and washings (A) were also cooled and acidified in the same way. The two solid precipitates were collected, washed with water and dried. The crude product was recrystallized from water. The pale yellow crystals were collected, washed with cold water and dried at 100° C. for 48 hours. The product (30.0 g.) decomposed at about 225° C. with prior sintering at about 205° C.

*Analysis.*—Calcd. for $C_{23}H_{23}NO_8S$: N.E., 473.5; N, 2.92%. Found: N.E., 474.4; N, 3.01%.

EXAMPLE 3

4-carboxyphenylammonium 5-benzoyl-4-hydroxy-2-methoxybenzenesulfonate

A quantity (18.5 g., 0.039 mole) of 4-carbethoxyphenylammonium 5-benzoyl-4-hydroxy-2-methoxybenzenesulfonate was combined with a solution prepared by dissolving 8.0 g. of sodium hydroxide in 150 ml. of water, and the mixture was heated to boiling. A clear yellow solution formed after about 10 minutes. The mixture was cooled and acidified with excess hydrochloric acid. The mixture was thoroughly cooled in an ice-bath, the cream colored crystals were collected, washed with cold water and dried at 50° C. The product (15.6 g.) decomposed at 226–227° C.

*Analysis.*—Calcd. for $C_{21}H_{19}NO_8S$: N, 3.14%; N.E., 222.7. Found: N, 3.11%; N.E., 221.1.

EXAMPLE 4

4-carbethoxyphenylammonium 5-benzoyl-4-hydroxy-2-methoxybenzenesulfonate monohydrate A quantity (456 g., 2 moles) of 2-hydroxy-4-methoxybenzophenone was dissolved in 1 liter of chloroform, and the solution was cooled to −5° C. Chlorosulfonic acid (466 g., 4 moles) was added during one hour while the temperature was kept below 2° C. The mixture was kept near 0° C. for two hours longer and then allowed to stand at room temperature overnight. A resulting almost solid mixture was diluted with 1 liter of benzene. A yellow solid was collected with suction and washed with benzene. Without drying, the crude solid material was added as rapidly as possible to a stirred solution of ethyl 4-aminobenzoate (330.5 g., 2 moles) in 1.2 liters of pyridine. The mixture was stirred and heated under reflux for four hours. The pyridine was removed by distillation on a steam bath in vacuo. A residue formed which was dissolved in 3 liters of water, and water was distilled off on a steam bath in vacuo to remove the remaining pyridine. The residue was dissolved in 9 liters of hot water. Yellow crystals which separated on cooling were collected, washed with water and dried at 50° C. This material (535 g.) was slurried with 2 liters of ether. Crystals were collected, washed with ether. More crystals separated from the aqueous filtrate and washings on standing. This crop was collected, washed with water and dried at 50° C. The two crops were combined and recrystallized from 120 liters of water. The hot solution was clarified with 180 g. of charcoal. Crystals thus obtained were collected, washed with water and dried at 50° C. for 24 hours. The product (543 g.) melted at 224–225° C.

*Analysis.*—Calcd. for $C_{23}H_{23}NO_8S \cdot H_2O$: N.E., 491.5; N, 2.85%. Found: N.E., 491.0; N, 2.83%.

The filtrate and washings were concentrated to a volume of 2 liters. An additional 138 g. of the material separated from this concentrate. This fraction was recrystallized from 4 liters of water to give 117 g. of product which melted at 224–225° C.

What is claimed is:

1. A compound selected from the group consisting of compounds of the formula:

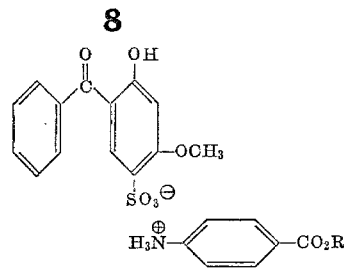

in which R is a member selected from the group consisting of H and lower alkyl.

2. A compound according to claim 1 having the structural formula:

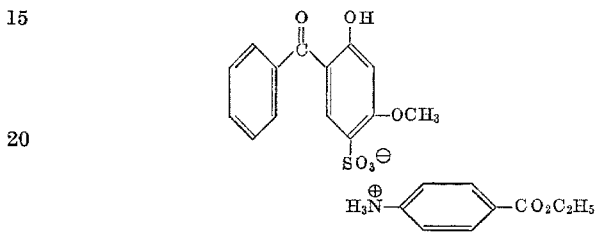

3. A compound according to claim 1 having the structural formula:

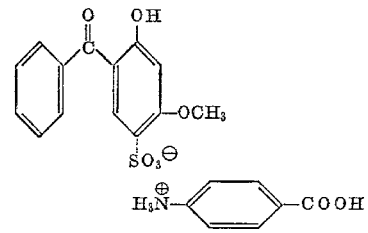

References Cited

UNITED STATES PATENTS 3,344,146  9/1967  Casadio _____ 260—501.21

OTHER REFERENCES

Fieser, L. F., et al. Organic Chemistry (1956), 3rd edition, Pub. by Reinhold Publishing Corp., N.Y., N.Y., (QD 257 F5), p. 747 relied on.

Finar, I. L., Organic Chemistry (1963), vol. I, Pub. by R. Clay & Co. of Great Britain (QD 251 F6), p. 679 relied on.

LORRAINE A. WEINBERGER, Primary Examiner

L. A. THAXTON, Assistant Examiner

U.S. Cl. X.R.

260—501.12; 424—60